Oct. 12, 1943.　　　　M. S. CLARK　　　　2,331,537
METHOD AND APPARATUS FOR WELDING.
Filed May 22, 1941　　　4 Sheets-Sheet 1

Fig. 1

Inventor
MALCOLM S. CLARK
By A. H. Oldham  Attorney

FIG.2

Oct. 12, 1943.    M. S. CLARK    2,331,537
METHOD AND APPARATUS FOR WELDING
Filed May 22, 1941    4 Sheets-Sheet 3

Fig.3

Inventor
MALCOLM S. CLARK
By
A H Oldham, Attorney

Oct. 12, 1943.  M. S. CLARK  2,331,537
METHOD AND APPARATUS FOR WELDING
Filed May 22, 1941  4 Sheets-Sheet 4

Inventor
MALCOLM S. CLARK
By A H Oldham Attorney

Patented Oct. 12, 1943

2,331,537

UNITED STATES PATENT OFFICE 2,331,537

METHOD AND APPARATUS FOR WELDING

Malcolm S. Clark, Warren, Ohio, assignor to The Federal Machine and Welder Company Application May 22, 1941, Serial No. 394,595

13 Claims. (Cl. 219—4)

This invention relates to welding methods and apparatus, and, more particularly is concerned with spot welding and other types of electric resistance welding, and with means for mounting and methods for moving the electrodes or dies thereof in an improved manner and for effecting an instantaneous forging of the weld after fusing.

Heretofore, in spot welding apparatus it has been the standard practice to provide a pair of electrode dies which are mounted for relative movement to and from each other. Usually, the lower die is mounted on a stationary, but vertically adjustable support, and the upper die is carried upon a slide or arm which is moved up and down by an air motor or other suitable means. It has been proposed heretofore to support the upper die in a cushioned manner on the slide or arm. For example, the die may be held on the slide by a second air motor or cushion, or may be resiliently positioned on the slide with the aid of metal springs.

Welding apparatus of the type described is open to the objection that the friction and inertia of the die carrier are comparatively high so that the dies do not properly follow and engage the work during the welding operation. This is particularly true with spot welding apparatus employed to make an interrupted spot weld (sometimes called persistence or pulsation welding). With known structures, once the dies have engaged with opposite sides of the work and the work softens between the dies due to the flow of current through the work, the dies do not always closely follow and completely engage the softened surface of the work throughout the entire duration of the welding operation. The result may be a burning of the metal, and, in all events, a failure to obtain the best possible type of weld in all materials.

It will be recognized that the difficulty mentioned is particularly noticeable in interrupted spot welding operations where each individual spot weld is made by a plurality of shots of welding current interspersed with periods of no current flow but with pressure being maintained on the dies during the entire operation. Obviously, when working with sixty cycle alternating current, and, particularly, when working with currents of higher frequency, the duration of each individual current shot of an interrupted spot weld is very small, and the total time to complete the spot weld may only be a small fraction of a second. I have found that the die follow up with known apparatus is unsatisfactory for many operations, and can be materially improved.

Prior to my invention it has been proposed to hold the electrodes or dies against the work to be welded with a welding pressure during the flow of electric welding current, and, thereafter, to apply a greater pressure to the electrodes to achieve a forging action upon the weld. For example, if the electrodes are held against the work by a fluid pressure motor the fluid pressure of the motor is increased after the welding operation so that the material just welded is thereupon forged. However, I have found that known methods and apparatus for changing the welding pressure to a forging pressure are so slow in operation compared to the rapidity with which the weld is made and the time in which the heat from the weld can escape that forging of the weld is unsatisfactory upon many occasions and when working with certain materials.

Again, I have discovered in known methods and apparatus for electric resistance welding, and particularly spot welding, for example of the interrupted type, that it is often difficult to exactly time the start of flow of welding current to the electrodes at exactly the same pressure. This is true even though the fact is old and well known that in order to obtain uniform welds pressure is one of the three variables, namely time, pressure and current flow, which must be held at a constant figure in order to obtain welds of a uniformly high grade character.

It is the general object of my invention to avoid and overcome the foregoing and other difficulties of and the objections to prior art methods and apparatus by the provision of welding methods and apparatus particularly adapted to electric resistance welding, and specifically spot welding, and in accordance with which materials which could not heretofore be satisfactory and uniformly welded can now be welded in a completely satisfactory manner and with a minimum of time, labor, and expense.

Another object of my invention is to provide an electrode mounting having a minimum of inertia and substantially no friction.

Another object of my invention is the provision of an improved spot welding apparatus and methods particularly adapted to interrupted spot welding operations.

Another object of my invention is to provide an electric resistance welding apparatus wherein rubber means are employed to mount at least one of the cooperating dies, with the rubber means serving to store up the welding pressure and to dispense it continuously and instantaneously to the dies to obtain a substantially uniform welding pressure on the dies throughout the complete duration of the welding operation regardless of the type of welding control utilized.

Another object of my invention is the provision of means and methods whereby in an electric resistance welding operation the electrodes are held against the work with a desired and uniform welding pressure and wherein an adjustable and pre-selected time after the flow of welding current to the electrodes has been initiated the welding pressure is changed substantially instantaneously to a greater and a forging pressure.

Another object of my invention is the provision of apparatus for forcing electrodes into engagement with the work to be welded at a forging pressure, means for opposing and reducing the force of the first named means so that at the start of the welding operation the electrodes are held together with a welding pressure only, together with means for substantially instantaneously releasing the opposing force means at a given time in the welding operation so that the welding pressure is substantially instantaneously changed to a forging pressure of substantially a constant value.

Another object of my invention is to provide a double acting fluid pressure motor for forcing the electrodes into engagement with the work with the differential in the pressures on opposite sides of the double acting fluid pressure motor achieving a welding pressure only, and time delay means initiated by the firing of the welder and a selected period of time after the initiation of the welding cycle to almost instantaneously release to atmosphere the fluid pressure on one side of the double acting fluid pressure motor to thereby achieve a forging pressure on the electrodes.

Another object of my invention is to provide means and methods for firing or initiating the operation of welding apparatus of the type described at exactly the same pressure of the electrodes against the work.

The foregoing and other objects of my invention are achieved by the provision of a pair of cooperating electrodes, an auxiliary slide carrying one electrode, a main slide, rubber mounting means carrying the auxiliary slide in association with the main slide, means for moving the main slide toward and from the other electrode to engage work between the electrodes and stress the rubber mounting means, means for supplying welding current to the electrodes when the rubber mounting means has been stressed to a selected pressure, means for opposing and reducing the pressure of the means moving the main slide and electrodes together so that at the time welding current is first supplied to the electrodes the pressure is a welding pressure only, and time delay means associated with the current supply means for substantially instantaneously releasing the pressure opposing means after a given flow of welding current so that a forging of the weld under higher pressure is obtained.

In accordance with the method of my invention I produce an iterrupted type of spot weld by moving a pair of welding electrodes into engagement with opposed portions of the work to be welded, thereafter holding the electrodes against the work by resilient rubber means and increasing the stress on the rubber means, passing a plurality of successive shots of welding current through the electrodes when the stress on the rubber means has reached an adjustable minimum, applying a force to the electrodes tending to move them apart prior to supplying a flow of welding current to the electrodes so that the pressure of the electrodes against the work does not exceed a maximum welding pressure, and quickly releasing the last-named force a selected time interval after the start of the flow of welding current so that the resulting increased force effects a forging action of the weld.

For a better understanding of my invention, reference should be had to the accompanying drawings wherein.

It should be appreciated that the principles of my invention may be employed with substantially any type of welding apparatus including electrodes or dies for contacting the work and adapted to direct a flow of electric current therethrough. However, my invention is particularly designed for and is best utilized in conjunction with spot welding apparatus including a pair of dies or electrodes adapted to be moved relatively toward and from each other into and out of engagement with the work piece. Spot welding apparatus of this character may take a plurality of forms as will be well understood by those skilled in the art. Accordingly, I have deemed it advisable to illustrate my invention in conjunction with spot welding apparatus, and in the accompanying drawings I have shown one particular embodiment of such apparatus and incorporating the features of my invention.

Referring to the drawings, the numeral 10 indicates a housing of an upright rectangular character which carries a transformer 12 of a suitable well known type therein, and which has a single turn secondary 14. The front of the housing 10 carries a platen 16 in a normally fixed but vertically adjustable position, as for example, by platen adjusting screws 18 and 20. Platen 16 is connected to one side of the secondary 14 of the transformer 12 and the platen adjustably carries a horn 22 which adjustably clamps a point, electrode, or die 24 which may be water cooled as by conduits 26.

Cooperating with the electrode or die 24 is a second point, electrode or die 28 which is adjustably clamped in a horn 30 carried by a platen 32 which is connected through suitable flexible conductors 34 to the other side of the secondary 14 of the transformer 12. The platen 32 is secured to or formed integral with an inner or auxiliary slide, shown as a whole by the numeral 40, and the inner slide is carried by a main slide 42 of rectangular box-like shape which is provided with vertically directed, laterally extending gibs 44 which are slidably received in opposed grooves formed in an upper arm or carrier bracket 46 secured to the housing 10 in a position vertically above the lower platen 16.

The position of the main slide 42 in the upper bracket 46 is conveniently controlled by the use of a fluid pressure motor 50 mounted in a head portion 52 carried in the top of the bracket 46.

Figure 1:
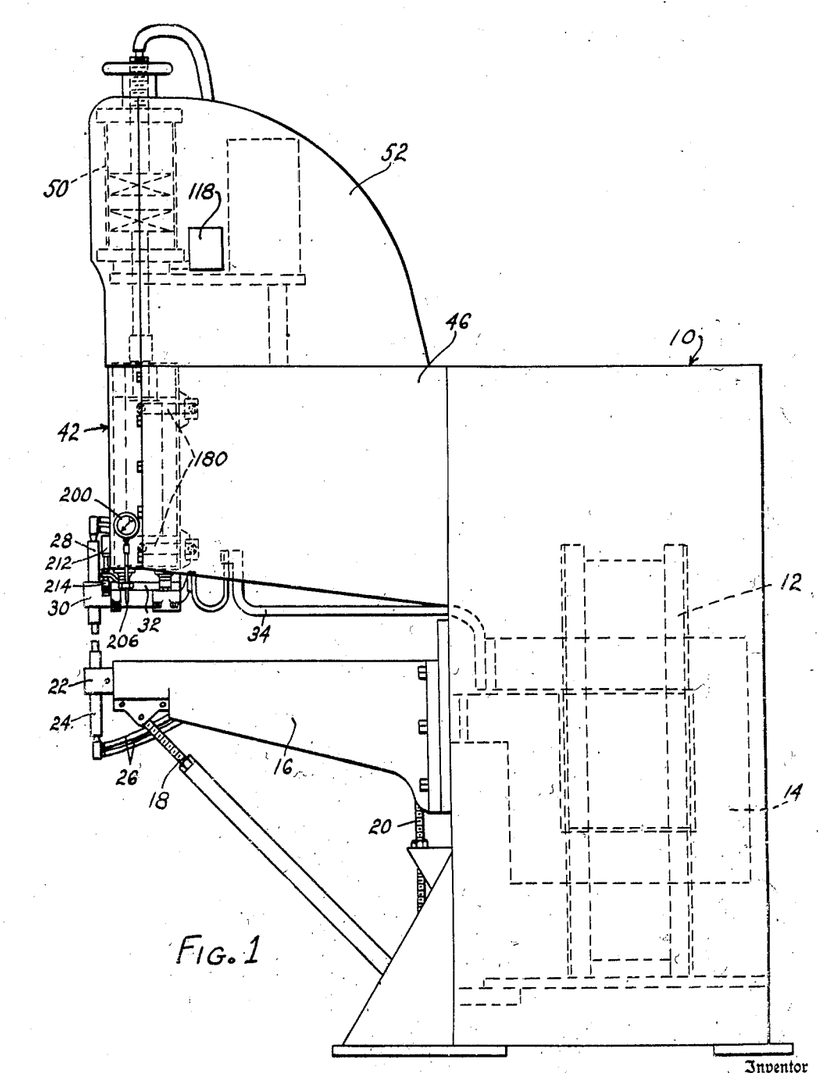
Fig. 1 is a side elevation of one form of spot welding apparatus incorporating the principles of my invention.
Figure 2:
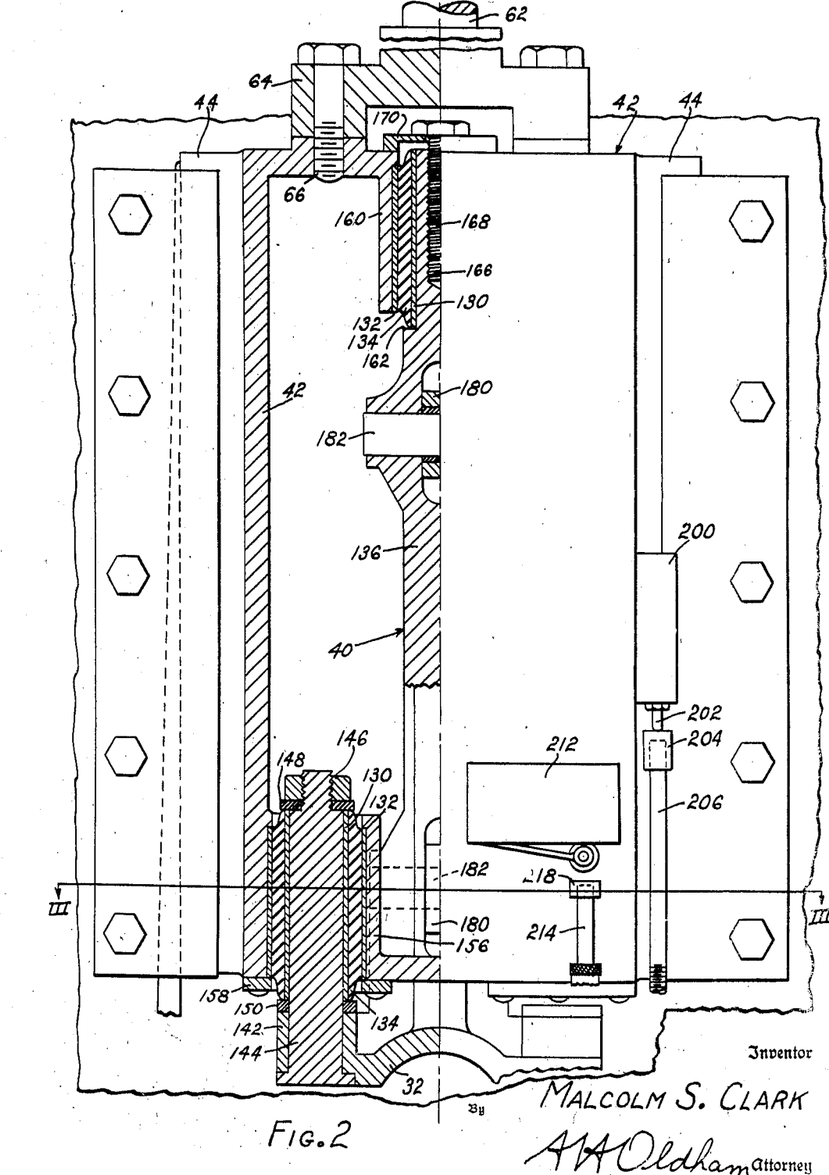
Fig. 2 is a front elevation partly in section and on a larger scale, of the slide and slide mounting means shown in Fig. 1.
Figure 5:
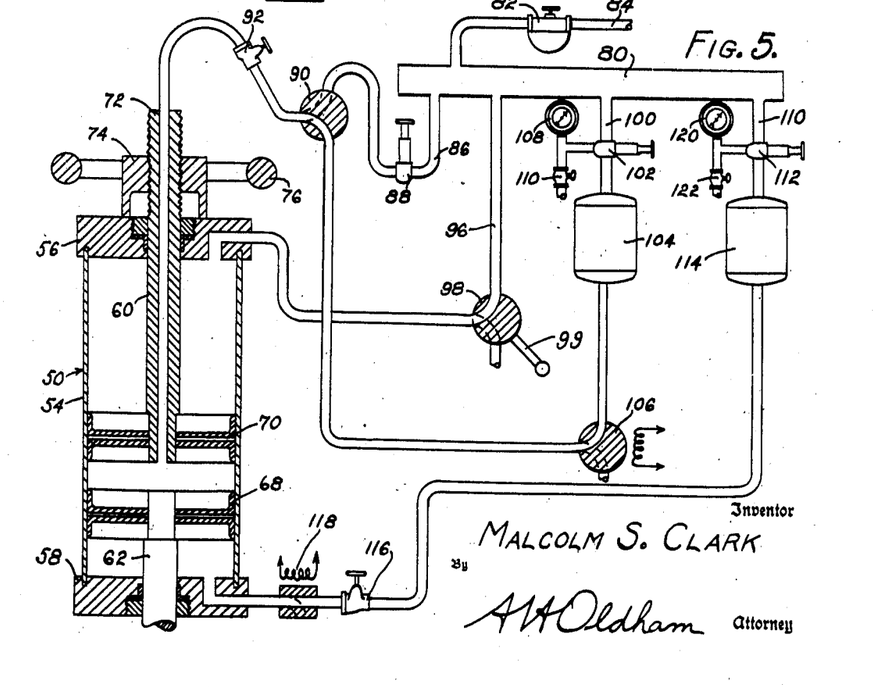
Fig. 5 is a schematic piping diagram of the apparatus shown in Figs. 1 to 3.

Having particular reference to Figs. 1, 2 and 5, the fluid pressure motor 50 includes a cylinder 54 having its ends closed by headers 56 and 58 which slidably receive through suitably packed openings piston rods 60 and 62 respectively. Piston rod 62 is secured to a yoke 64 which is fastened to the upper end of the main slide 42 by bolts 66. Piston rod 62 is secured at its other end to a piston 68 of the double acting type. The piston rod 60 has a double acting piston 70 secured to its lower end and the upper end of the piston rod 60 is threaded, as at 72, to adjustably receive an internally threaded hub 74 having a hand wheel 76 secured thereto so that by adjusting the hand wheel 76 the lowermost position of the piston 70 in the cylinder 54 can be controlled.

Turning to Fig. 5, the piping arrangement for controlling the operation of the fluid pressure motor 50 includes a manifold 80 connected through a lubricator 82 and by way of a conduit 84 to a suitable force of fluid pressure. From the manifold 80 a conduit 86 extends through a fluid pressure regulating valve 88, a three-way valve 90, and a speed-control valve 92 to the inside of the piston rod 60 which is made hollow so that air or other fluid can flow down between the pistons 68 and 70. A conduit 96 extends from the manifold 80 through a three-way valve 98 and header 56 to the upper side of the piston 70. A conduit 100 extends from the manifold 80 through a fluid pressure regulator valve 102, a pressure storage tank 104, and a three-way solenoid valve 106 to the three-way valve 90. A fluid pressure gauge 108 and an atmosphere exhaust valve 110 are connected to the regulator 102. A conduit 110 also extends from the manifold 80 to a fluid pressure regulator 112, a pressure tank 114, a speed control valve 116, a three-way solenoid valve 118, through the header 58 to the underside of the piston 68. A pressure gauge 120 and atmospheric exhaust valve 122 are connected to the regulator valve 112.

Figure 3:
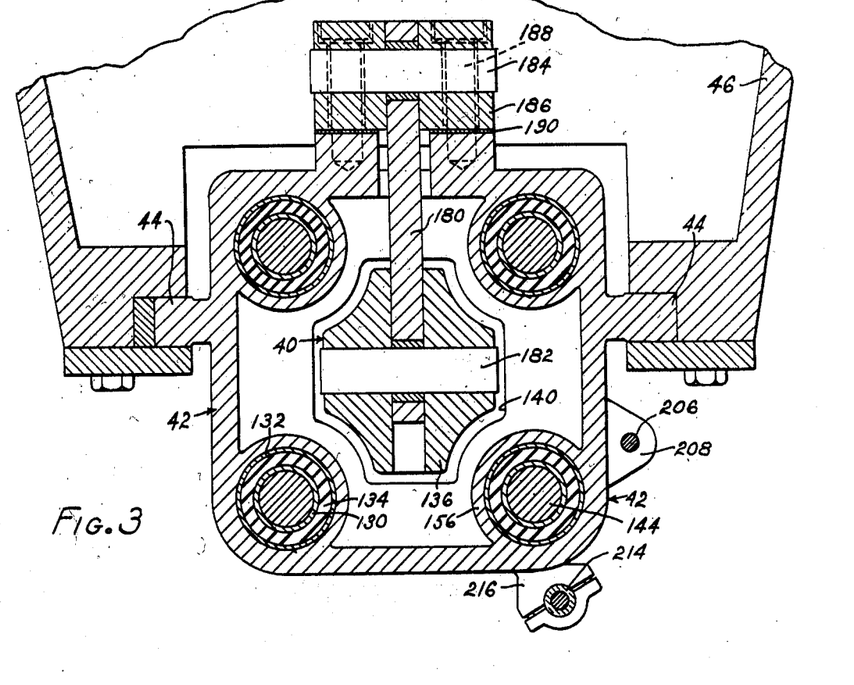
Fig. 3 is a horizontal cross-sectional view taken on line III—III of Fig. 2.

Turning now to the manner in which the inner or auxiliary slide 40 is mounted in association with the main slide 42, and having particular reference to Figs. 1, 2 and 3, this is achieved with the aid of rubber cushioning means. Although various types or rubber cushioning means may be employed, I have found those to be particularly advantageous in which the rubber is held under tension and absorbs the cushioning shocks in tension. One excellent type of rubber cushioning means or unit of the character indicated includes, as shown in the drawings, an inner metal sleeve 130 and a somewhat shorter, radially spaced outer metal sleeve 132 with an interposed body of rubber 134 held between the inner and outer sleeves and preferably vulcanized to each sleeve. Generally I employ a plurality of the rubber cushioning units in order to secure the inner slide 40 to the outer or main slide 42.

The upper platen 32 has secured thereto in a central and a vertically extending position a post 136 which extends up centrally of the box of the main slide 42, with the bottom of the main slide 42 being apertured as at 140 to receive the post 136. The upper platen 32 is also formed with a plurality, usually four as shown, of apertured bosses 142 positioned substantially in a horizontal plane and at the four corners of the platen and adapted to receive bolts 144 to which the inner metal sleeves 130 of the rubber units are secured respectively by means of a nut 146 and spacing washers 148 and 150. Ordinarily, the means for holding the outer metal sleeve 132 of each rubber cushioning unit comprises a cylinder 156 integral with the main slide which cylinder is counterbored to receive the outer metal sleeve 132. The cylinders 156 are positioned at the four lower corners of the main slide as illustrated. A locking ring 158 secured to the bottom of the main slide 42 holds the outer metal sleeve 132 of each rubber cushioning unit securely in the main slide 42. The upper end of the post 136 is secured with a rubber cushioning unit to the upper end of the main slide. This is accomplished by providing a cylinder 160 centrally of the upper end of the main slide 42 which cylinder is counterbored to receive the outer metal sleeve 132 of a rubber cushioning unit. The inner metal sleeve 130 of the rubber cushioning unit fits snugly over the reduced end of the post 136 and down against a shoulder 162 on the post. The post 136 of the inner slide is provided with a tapped hole 166 at its upper end which receives a bolt 168. A washer 170 positioned between the head of the bolt 168 and the upper end of the main slide 42, in the manner shown in Fig. 2, provides an adjustment for the several rubber cushioning units in the assembly. Particularly, when the bolt 168 is tightened the central post 136 and upper platen 32 are moved upwardly with respect to the main slide 42 and this places an initial tension stress on each of the rubber cushioning units. By adjusting the degree of this tension the stiffness of the cushioning action provided by the rubber units can be controlled.

It will be understood that the construction of the parts is such that any upward thrust on the upper platen 32, horn 30, or die 28 causes the upper platen 32, the central post 136 and the parts carried thereby to move upwardly in the main slide 42 with the rubber in the rubber cushioning units cushioning the movement in tension and storing up the energy of the movement to be released as the dies follow the work in the welding operation.

In order to properly center the inner or auxiliary slide 40 in the main slide 42 at all times during the operation of the apparatus, and to prevent any side play of the inner slide in the main slide I preferably provide parallel linkage means which take the form of a pair of links 180 which are pivotally secured at one end, as by pins 182, to the central post 136 of the inner slide 40 which is appropriately recessed to receive the links. The other end of the links 180 are pivotally secured, as by pins 184, to blocks 186 which are fastened to the back of the main slide 42 by insulated bolts 188. Insulation 190 positioned between the blocks 186 and the main slide 42 together with the rubber mounting of the inner slide in the main slide insures that none of the welding current passed through the upper platen 32 becomes grounded on the frame of the apparatus. By positioning the links 180 at spaced points vertically in the post 136, as best shown in Figs. 1 and 2 of the drawings, the post and thus the whole inner slide and upper platen 32 is given a parallel linkage mounting so that it is properly centered within the main slide at all times even though the die 28 is positioned at a considerable distance off center from the upper platen 32. The movement of the inner slide in the main slide is in the most extreme cases only relatively small so that the parallel links 180 function in a completely satisfactory manner.

An important part of my invention is the provision of apparatus for firing or initiating the welding operation at the same time in each one of a series of welding operations and at a time when the pressure of the dies 24 and 28 on the work is at a selected figure. I achieve this in the embodiment of my invention illustrated by the provision of a deflection meter 200 which is mounted on the main slide 42 and which has the usual outwardly extending plunger 202 which is engaged by an insulated cap 204 carried by a pin 206 having its lower end threaded and received in a tapped opening in a bracket 208 carried by the upper platen 32. The position of the pin 206 in the bracket 208 is adjusted so that during the operation of the apparatus any pressure applied to the upper platen 32 and causing upward movement of the inner slide with respect to the main slide 42 will create a deflection measured by the meter 200 which can be calibrated either in pounds or in fractions of an inch of deflection with the pressure or deflection being read from a suitable chart.

On the front of the main slide 42 I mount a micrometer switch 212 which is adapted to be operated by the upper end of a micrometer screw 214 and carried in a suitable bracket 216 secured to the upper platen 32. The upper end of the micrometer screw 214 carries an insulating cap 218 so that the inner and main slides are maintained in insulated relation from each other.

Figure 4:
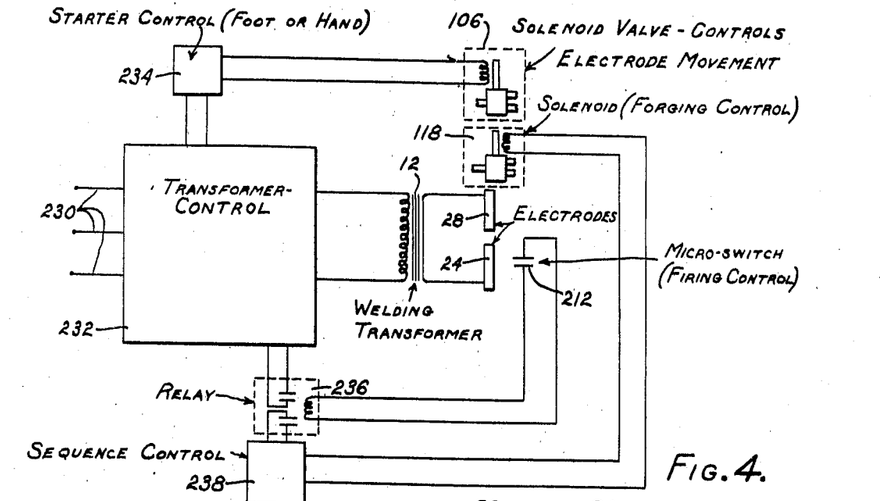
Fig. 4 is a schematic wiring diagram of the apparatus shown in Figs. 1 to 3.

Referring now to Fig. 4, the numeral 230 indicates a three phase input connection to the transformer and condenser discharge control panel 232 associated with the welding apparatus. The welding transformer 12 is connected to the control panel 232 and the secondary of the transformer extends to the electrodes 24 and 28. Also associated with the control panel 232 is the starter control 234 which may be of either the hand or foot type and which is connected to operate the three-way solenoid valve 106. The micro-switch 212 is connected to a relay 236 so that when the micro-switch 212 is closed the relay 236 initiates the discharge of the condensers in the control panel 232 through the welding transformer 12 and thus supplies the welding current to the electrodes 24 and 28. Also, the relay 236 operating through a sequence panel 238 and time control mechanism therein operates the three way solenoid valve 118 to effect the application of the forging pressure a given time interval after the welding operation has been initiated.

A more complete description of the operation of the apparatus will now be given. The fluid pressure motor 50 is first adjusted so that the proper die or electrode clearance is established for operations upon any given work piece. Specifically, it is desirable to have the electrodes travel only a relatively short distance into engagement with the work, and yet the electrodes must be capable of being moved relatively far apart so that operations can be performed upon the inside of flanged work pieces and the like. Particularly, the hand wheel 76 is adjusted so that the piston 70 normally limits the upward movement of the piston 68, with the upward limit of movement of the piston 68 being such that the work piece can be moved into welding position between the electrodes or dies with a minimum of clearance. It will be understood that the electrode or die clearance should be kept as small as possible to facilitate smooth operation and speed of production. The piston 70 is normally held down to its lowermost position with the hub 74 of the hand wheel in engagement with the header 56 by means of a relatively high fluid pressure, of say 200 pounds per square inch passed to the upper side of the piston by conduit 96 from manifold 80. The three way valve 98 connected in the conduit 96 is adapted to open the upper side of the piston 70 to the atmosphere when the handle 99 is thrown at which time the piston 70 can be moved clear to the top of the cylinder 54. With the piston 70 at the top of the cylinder 54 the piston 68 can be raised considerably higher to give a relatively large clearance between the electrodes or dies to thereby allow the insertion of a work piece between the electrodes or dies even though the work piece has a relatively high upstanding flange or the like with the weld to be performed on the inner side of the flange.

Fluid under pressure is passed to the under side of the piston 68 by way of conduit 110 and, in order to insure the type of action above generally referred to and hereinafter described in detail, the fluid pressure regulator valve 112 is carefully set to provide a given fluid pressure in the tank 114 as indicated by the pressure gauge 120. The speed regulating valve 116 is set so that fluid, such as air, under a pressure of say 75 pounds per square inch is provided on the under side of the piston 68 which normally tends to hold the piston 68 up against the under side of the piston 70.

Also, fluid under pressure is supplied through the conduit 100 to the fluid pressure regulating valve 102 which is carefully set so that air under a desired and a greater pressure is supplied to the tank 104 with the pressure being determined by the air gauge 108. From the tank 104 the conduit 100 passes through the three-way solenoid valve 106, the three-way valve 90, speed regulator valve 92 and down through the center of the hollow piston rod 60 to the space between the pistons 68 and 70. Normally, the fluid, usually air, thus passed to the space between the pistons 68 and 70 is under greater pressure than the pressure on the fluid at the under side of the piston 68, for example 150 pounds per square inch. Thus, when fluid under a pressure of say 150 pounds per square inch is applied to the upper side of the piston 68, and fluid under pressure of say 75 pounds per square inch is applied to the under side of the piston 68, the piston is forced downwardly by the differential in pressure. It will be understood that the three-way valve 90 provides a hand control for moving piston 68 downwardly to thus bring the dies together whereas the three-way solenoid valve 106 is the automatic control normally employed in the usual operation of the apparatus.

A work piece of the size to be welded is now placed between the electrodes 24 and 28 and the starter control 234 is operated to open the three-way solenoid valve 106. Fluid under pressure then flows through the conduit 100 to the space between the pistons 68 and 70 to force the piston 68 and the upper die 28 carried thereby down against the upper surface of the work which in turn forces the work down against the lower die 24. It will be seen that the greater pressure on the upper surface of the piston 68 and the lesser pressure on the under surface of the piston 68 causes the piston to be forced down by the difference between these pressures and the areas over which they work. The exact value of one or both of the pressures can be adjusted by means of the pressure regulating valves 102 and 112 so that the exact differential pressure on the upper electrode 28 can be very closely and accurately controlled to give the desired welding pressure on the dies or electrodes.

Now when the upper electrode or die 28 is forced down into engagement with the work it will be recognized that the inner auxiliary slide 40 including the upper platen 32 and the post 136 will be moved upwardly in the main slide 42 against the cushioning action of the rubber means mounting the inner slide in the main slide. The resistance of the cushioning action provided by the rubber mounting means is initially adjusted by the screw 168 so that the cushioning action can be stiff or relatively soft or any degree therebetween as desired for any given welding operation. The cushioning action of the rubber should be such that the inner side is moved up into the main slide a distance which will considerably more than cover the movement of the dies in following the work during the welding operation. When the inner slide is moved up into the main slide in this manner the rubber units are "cocked" or stressed so that they impart to the upper die the work following characteristics hereinafter more particularly described.

It is sometimes difficult to determine the exact differential welding pressure effective to move the dies together even though the difference between the pressures on the gauges 108 and 120 can be readily taken with the upper and lower surface areas of the piston 68 being known. However, due to fluctuations in line pressure, temperature changes, lubrication differences, difficulty of complete and accurate control of pressures by pressure regulating valves 102 and 112, and other reasons, it is highly advantageous to more directly determine the effective pressure on the electrodes themselves. To this end, the deflection meter 200 mounted on the side of the main slide 42 serves in conjunction with the adjustable pin 206 to give either a direct reading of the pounds of displacement imparted to the rubber cushioning means, or the meter 200 can merely indicate the displacement effected between the inner slide 40 and the main slide 42 with the exact pressure being determined from a carefully calibrated graph.

In all events, assuming that for a given job it has been found desirable to hold the dies against the work piece during the welding operation with a pressure of say 2,000 pounds, the micrometer screw 214 is accordingly adjusted so that when the meter 200 reads 2,000 pounds the micro-switch 212 is closed. Thus, the welding operation is initiated with exactly the same pressure on the electrodes or dies over a long series of welding operations, which is very important in order to achieve uniformity of welds.

It will be understood that the effective differential in fluid pressure tending to move the upper electrode 28 down against the work piece must be great enough to compress the rubber cushioning means to the desired pressure to close the micro-switch 212. Usually, the differential in pressure is set by adjusting the pressure regulator valves 102 and 112 so that the differential pressure is always great enough to close micro-switch 212 but is only a little greater. Closing the micro-switch 212 operates the relay 236 to initiate the flow of welding current from the control panel 232 through the transformer 12 and thence to the electrodes 24 and 28. Also, micro-switch 212 operating through the relay 236 starts into operation through the sequence control panel 238 time delay mechanism which is adapted after a predetermined and selected period to operate and open the three-way solenoid valve 118 to the atmosphere. As is evident from the drawings, the three-way solenoid valve 118 is placed very close to the bottom of the cylinder 54 so that the discharge from the bottom of the piston 68 to the atmosphere is relatively short and direct. Thus, after a selected flow of welding current through the electrodes with the electrodes being held together with a welding pressure only, the force on the electrodes is substantially instantaneously changed to a forging pressure. Accordingly, a heavy forging pressure is applied to the electrodes, as for example 4,000 pounds, and the weld is forged in a very rapid and positive manner. I have found that it is possible to change from a welding pressure to a forging pressure in a much quicker and more positive manner by releasing a counteracting or opposing force, such as the fluid pressure applied to the bottom of the piston 68, than is possible when an attempt is made to increase the fluid pressure on the top or upper side of the piston 68. It is often very important to effect an almost instantaneous change from the welding to the forging pressure as any slight delay is apt to result in the solidification of the weld before forging with the attending difficulties of effecting true forging results. Also, in some cases attempts to begin forging while there is still a flow of current between the electrodes may result in an undesirable squeezing out of the material between the electrodes.

Returning now to the action of the rubber cushioning means immediately after the flow of welding current to the electrodes, it will be recognized that as the work piece softens beneath the dies due to the flow of electric current, the dies must closely follow and engage the work piece in order to obtain the best type of weld. I have found that the "cocked" rubber cushioning means mounting the inner slide in the main slide possess substantially no friction and the inner slide possesses the minimum of inertia being made as light as possible so that the upper die 28 very closely follows the work piece and keeps the work piece down in very intimate contact with the lower die 24. Thus, there is no burning or substantial change in resistance of the contact between the electrodes and the work piece during the entire welding operation. If there is considerable movement of the dies into the work piece during the welding operation the main slide 42 may follow down also under the influence of the fluid pressure, however, no movement of the main slide is ordinarily required.

I have found that the action just described is advantageous and provides a particularly high grade, uniform and improved type of weld upon ordinary material when spot welded in a non-interrupted manner. But particularly, my improved apparatus and die mounting means is adapted to interrupted spot welding operations, sometimes called pulsation welding or persistence welding. In welding operations of this character the dies are first engaged with the work and the work is given a series of shots of welding current, each shot of current being interspersed with periods when no welding current flows but during which the dies remain in constant engagement with the work. Much heavier gauge stock can be spot or mash welded in this manner. Also, by this method, rusty or scaly stock can often be welded without cleaning.

Various types of controls for interrupted spot welding have been provided. For example, vacuum tube controls have been used in which the welding current is allowed to be on for a fraction of a cycle or a plurality of cycles with the current being then interrupted for a fraction of a cycle up to a plurality of cycles, and with the operation being repeated any desired number of times. Also, capacitors may be employed in the welding circuit which are charged for a fraction of a cycle up to a plurality of cycles followed by a discharge of the capacitors for a fraction of a cycle or a plurality of cycles.

In a control of the type described even with sixty cycle operation the time in which the dies must follow the work in interrupted spot welding is very short. When the same or a similar type of interrupted spot welding employs current of high frequencies the time in which the dies must move becomes proportionately shorter and this is true regardless of the exact type of control for the welding operation.

I have discovered that the rubber cushioning means disclosed herein provide a very quick and improved follow up of the dies in substantially any type of spot welding operation, and, particularly, interrupted spot welding operations, and specifically those of higher frequencies. I believe that the follow up action which my improved apparatus provides results in a weld forging action totally lacking in many spot welding operations performed or attempted to be performed heretofore. In fact, the weld follow up and associated forging action provided is quite different and distinct from the type of follow up action provided by metal springs or an air motor and I have performed many spot welding operations with my improved apparatus which were impossible to perform with known apparatus and methods, and I believe that this is due in part to the relatively low friction and inertia of my die holding means when compared to the friction and inertia of former apparatus. In other words, I obtain an instantaneous follow up and forging of the weld at the proper pressure regardless of whether the weld is made with high or low frequency alternating current or direct current, or is made interrupted or non-interrupted. Thus, when the improved action provided by the rubber cushioning means is combined with the almost instantaneous change from welding to forging pressures, as effected by the release of the pressure on the under side of the piston 68, a forged weld can be obtained upon relatively thin aluminum and many other similar materials which has heretofore been either very difficult to achieve in a satisfactory manner or has been impossible to produce.

The welding cycle is completed by closing solenoid valve 118 to again apply fluid pressure to the under side of the piston 68, and opening solenoid valve 106 to the atmosphere. These operations are controlled automatically from the panels 232 and 238 and return the piston 68 up against the under side of piston 70. Thus, the apparatus is ready for another complete cycle of welding operations as already described.

From the foregoing it will be recognized that the various objects of my invention have been achieved by the provision of a relatively inexpensive and simple but durable and long wearing welding apparatus wherein electrodes or dies are mounted in an improved manner so that they will very closely engage, follow and forge the work during a welding operation. Lubrication of the inner metal slide in the main slide is eliminated, and the adjustment of the "cocking" and cushioning action provided by the rubber means is quick and simple. The apparatus can be quickly adapted to operations upon a wide variety of materials necessitating welding and forging pressures of considerable different values and operations can be performed upon materials having upstanding flanges or other interrupting portions in a rapid and efficient manner. The welding operation is initiated at exactly the same pressure in each one of a plurality of welds and this pressure can be readily and accurately adjusted so that firing of the welder occurs at the exact instant desired. Thus a long stride has been taken to eliminate variables and fluctuating conditions in the production of electric resistance welds and the result is the production of more uniform and definitely improved welds. The principles of my invention adapt themselves to use with substantially any type of welding apparatus, and maintenance and repair are at a minimum.

The exact number, size and position of the individual rubber cushioning units may be widely varied to best adapt them to any particular apparatus or welding requirement. Preferably I construct all of the inner slide parts of the lightest weight metal affording the requisite strength so that the inertia thereof will be kept at a minimum. Also, it will be recognized that in certain instances the fluid pressure motor can be dispensed with and other means provided for moving the electrodes together.

While in accordance with the patent statutes I have particularly illustrated and described one embodiment of my invention, it will be understood that I am not to be limited thereto or thereby but that the scope of my invention is defined in the appended claims.

I claim:

1. An electric resistance welding apparatus comprising a pair of cooperating electrodes, an auxiliary slide carrying one electrode, a main slide, rubber means mounting the auxiliary slide in association with the main slide, means for moving the main slide toward and from the other electrode to engage work between the electrodes and stress the rubber mounting means, means for supplying welding current to the electrodes when the rubber mounting means has been stressed to a selected pressure, means for opposing and reducing the pressure of the means moving the main slide and the electrodes together so that at the time the welding current is first supplied to the electrodes the pressure is a welding pressure only, and time delay means associated with the current supply means for substantially instantaneously releasing the pressure opposing means after a given flow of welding current so that a forging of the weld under higher pressure is obtained.

2. Electric resistance welding apparatus including a pair of relatively movable dies, rubber mounting means for one of the dies and resiliently supporting the die in the direction of relative movement, fluid-pressure means for moving the dies toward and from each other, said last named means moving the dies together with a force to provide weld forging pressure, fluid-pressure means opposing the movement of the dies together with a lesser force so that the resultant force on the dies becomes a welding pressure, means for supplying welding current to the dies at the instant that the pressure of the dies against the work exceeds a selected minimum pressure, and means for substantially instantaneously releasing the force of the said opposing means at a selected time after the initiation of the welding operation so that the weld is forged at a forging pressure.

3. Electric resistance welding apparatus including a pair of relatively movable dies, rubber mounting means for one of the dies and resiliently supporting the die in the direction of relative movement, means for moving the dies toward and from each other, said last-named means moving the dies together with a force to provide weld forging pressure, means opposing the movement of the dies together with a lesser force so that the resultant force on the dies becomes a welding pressure, means for supplying welding current to the dies at the instant that the pressure of the dies against the work exceeds a selected minimum pressure, and means for releasing the force of the said opposing means at a selected time after the initiation of the welding operation so that the weld is forged at a forging pressure.

4. Electric resistance welding apparatus including a pair of relatively movable dies, rubber mounting means for one of the dies and resiliently supporting the die in the direction of relative movement, means for moving the dies toward and from each other, said last-named means moving the dies together with a force to provide weld forging pressure, means opposing the movement of the dies together with a lesser force so that the resultant force on the dies becomes a welding pressure, means for supplying welding current to the dies and means for releasing the force of the said opposing means at a selected time after the initiation of the welding operation so that the weld is forged at a forging pressure.

5. That method of resistance welding which comprises moving a pair of welding electrodes into engagement with opposite sides of the work to be welded, holding the electrodes against the work, passing a plurality of successive shots of welding current to the electrodes when the stress on the electrodes has reached an adjustable minimum, applying a force to the electrodes tending to move them apart prior to and during the flow of welding current to the electrodes so that the pressure of the electrodes against the work does not exceed a maximum welding pressure, and quickly releasing the last-named force a selected time interval after the start of the flow of welding current so that the resulting increased force effects a forging action on the weld.

6. That method of resistance welding which comprises moving a pair of welding electrodes into engagement with opposite sides of the work to be welded, holding the electrodes against the work, passing welding current to the electrodes, applying a force to the electrodes tending to move them apart during the flow of welding current to the electrodes so that the pressure of the electrodes against the work does not exceed a maximum welding pressure, and quickly releasing the last-named force a selected time interval after the start of the flow of welding current so that the resulting increased force effects a forging action on the weld.

7. That method of pulsation resistance welding which comprises moving a pair of welding electrodes into engagement with opposite sides of the work to be welded, holding the electrodes against the work through resilient rubber means and increasing the stress on the rubber means, passing a plurality of successive shots of welding current to the electrodes when the stress on the rubber means has reached an adjustable minimum, holding the electrodes against the work with only a welding pressure during at least part of the flow of welding current, and after an adjustable time interval from the start of the welding operation quickly increasing the welding pressure to a forging pressure.

8. That method of pulsation spot welding which comprises moving a pair of welding electrodes into engagement with opposite sides of the work to be welded, holding the electrodes against the work, passing a plurality of successive shots of welding current to the electrodes, applying a force to the electrodes tending to move them apart prior to and during the flow of welding current to the electrodes so that the pressure of the electrodes against the work does not exceed a maximum welding pressure, and quickly releasing the last-named force a selected time interval after the start of the flow of welding current so that the resulting increased force effects a forging action on the weld.

9. That method of electric resistance welding which comprises moving a pair of welding electrodes into engagement with the work to be welded, holding the electrodes in engagement with the work with a weld forging pressure but counteracting the weld forging pressure during the initial stages of the operation with a lesser force directed to reduce the weld forging pressure to a welding pressure only, and releasing the lesser force after a given time interval so that the full forging pressure is applied to the electrodes to thereby complete the weld by forging.

10. Electric resistance welding apparatus including a pair of electrode dies, a fluid pressure motor having a double acting piston for moving the dies into engagement with the work, means for supplying fluid under a given pressure to the side of the piston remote from the dies to move the dies into engagement with the work, means for supplying fluid under a lesser pressure to the other side of the piston to counteract a part of the pressure on the dies, means for firing the welder, means for opening the said other side of the piston to the atmosphere, and time delay means associated with the firing means for operating said opening means a short interval of time after the firing means has initiated the welding operation.

11. Electric resistance welding apparatus of the interrupted spot welding type including a pair of electrodes, means for moving the electrodes toward each other with a weld forging force, means applying a lesser force to the electrodes and tending to move them apart so that the resultant of the forces moves the electrodes together with a welding force, means for supplying a series of shots of welding current to the electrodes when the pressure of the electrodes against the work reaches a desired minimum, and time delay means associated with the current supplying means for releasing the application of the lesser force to the electrodes at a selected time after the weld has been initiated so that the metal of the weld is fused under one pressure and forged under a heavier pressure.

12. Electric resistance welding apparatus including a pair of relatively movable electrodes, means exerting a force tending to move the electrodes together with a weld forging pressure, means exerting a lesser force tending to hold the electrodes apart, the resultant of said means serving to hold the electrodes together with a welding pressure only, and means for quickly releasing the lesser force means so that the electrodes may be held together with full forging pressure.

13. That method of electric resistance welding which includes the steps of applying a forge welding force to a pair of cooperating electrodes, applying a lesser force and in the opposite direction to the electrodes so that the electrodes are held in engagement with the work by a welding force only during the welding operation, and substantially instantly removing the lesser force after a selected time interval so that the welding force is substantially instantly changed to a forging force.

MALCOLM S. CLARK.